United States Patent [19]
Taft

[11] 3,957,074
[45] May 18, 1976

[54] CONTROL VALVE ASSEMBLIES FOR VEHICLE HYDRAULIC BRAKING SYSTEMS

[75] Inventor: Philip Augustus Taft, Solihull, England

[73] Assignee: Girling Limited, Birmingham, England

[22] Filed: Apr. 26, 1974

[21] Appl. No.: 464,302

[30] Foreign Application Priority Data
May 2, 1973 United Kingdom............... 20948/73

[52] U.S. Cl.................................. 137/102; 91/434; 137/627.5
[51] Int. Cl.²..................... G05D 16/10; F15B 13/14
[58] Field of Search............. 91/370, 371, 372, 373, 91/434; 137/102, 627.5, 625.27, 625.5, DIG. 2

[56] References Cited
UNITED STATES PATENTS

| | | | |
|---|---|---|---|
| 1,114,937 | 10/1914 | Tessner.......................... | 137/DIG. 2 |
| 2,137,954 | 11/1938 | Sanford et al. ................... | 91/434 |
| 2,544,042 | 3/1951 | Pontius, III ......................... | 91/372 |
| 2,745,383 | 5/1956 | Hupp.................................. | 91/372 |
| 2,761,427 | 9/1956 | Shumaker............................ | 91/373 |
| 2,779,314 | 1/1957 | Vorech ................................ | 91/372 |
| 2,952,247 | 9/1960 | Swanson ........................ | 137/625.5 |
| 2,967,544 | 1/1961 | Pearsall........................ | 137/DIG. 2 |
| 3,074,383 | 1/1963 | Schultz .............................. | 91/434 |
| 3,101,742 | 8/1963 | Kellogg.............................. | 91/434 |
| 3,252,382 | 5/1966 | Kellogg et al...................... | 91/434 |
| 3,326,239 | 6/1967 | Saint-Joanis et al........... | 137/625.27 |
| 3,692,039 | 9/1972 | Ewald et al...................... | 137/118 |

Primary Examiner—Martin P. Schwadron
Assistant Examiner—G. L. Walton
Attorney, Agent, or Firm—Scrivener Parker Scrivener and Clarke

[57] ABSTRACT

In a control valve assembly of the kind set forth for vehicle braking systems a valve-operating member for operating first and second valves is guided to slide in a bore in a piston. The valve-operating member is adapted to permit the second valve to close and the first valve subsequently to open when the first piston is returned to an inoperative retracted position in response to the pressure of fluid remaining the pressure space when the applying force is relieved, the pressure space being defined between the first piston and a second piston.

1 Claim, 3 Drawing Figures

CONTROL VALVE ASSEMBLIES FOR VEHICLE HYDRAULIC BRAKING SYSTEMS

SPECIFIC DESCRIPTION

This invention relates to control valve assemblies or hydraulic boosters for vehicle braking systems of the kind comprising a cylinder body, a first positively actuated piston working in a bore in the cylinder body, a second floating piston working in the bore in a position in advance of the first piston, a pressure space defined in the bore between the pistons, a first normally open valve controlling communication between a port for connection to a reservoir for hydraulic fluid and the pressure space, a second normally closed valve controlling communication between the pressure space and a passage for connection to a source of fluid under pressure, the arrangement being such that initial movement of the first piston into the bore in response to an applying force closes the first valve and subsequent movement of the first piston in the same direction opens the second valve to supply fluid under pressure to the pressure space.

In known control valve assemblies or boosters of the kind set forth it is essential for the first valve to be tightly closed when the second valve is open and during a period in which a balanced condition is reached when the second valve closes as the pressure in the pressure space approaches or substantially equals that of the source.

According to our invention in a control valve assembly or hydraulic booster of the kind set forth for vehicle braking systems a valve-operating member commmon to both valves is guided to slide in a bore in a one of the pistons and is adapted to permit the second valve to close and the first valve subsequently to open when the first piston is returned to an inoperative retracted position in response to the pressure of fluid remaining in the pressure space when the applying force is relieved.

By incorporating a valve-operating member common to both valves ensures that when the pressure space is pressurized the first valve is always subjected in a closing direction to a closing force consisting in the resultant pressure differential acting across the valve. Since the pressure differential is between the pressure in the pressure space and fluid pressure in the reservoir, which is at atmospheric pressure, the magnitude of the closing force is substantial.

Preferably, the valve-operating member is positively coupled to one of the pistons, conveniently the second piston, by coupling means permitting movement relative thereto, and the coupling means is constructed and arranged to permit the second valve to close and the first valve subsequently to open when the first piston is returned to the inoperative retracted position.

When the applying force is relieved, the valve-operating member can move with the first piston and relative to the second piston to permit the second valve to close. That movement of the valve-operating member is arrested before the first piston reaches its inoperative position so that subsequent movement of the first piston away from the valve member is operative to open the first valve.

Thus, retraction of the first piston and opening of the first valve depends entirely on the pressure within the pressure space and does not depend on operation of other means, for example a return spring acting on the first piston.

In one construction the first valve comprises a seating at the inner end of the bore in the first piston in which the valve-operating member works and with which a head at that end of the valve-operating member is adapted to engage, and a probe at the opposite end of the valve-operating member acts as a push-rod to urge a spring-loaded valve member away from a seating in the second piston, a shoulder spaced from the free end of the probe being adapted to engage with stop means in the second piston to arrest movement of the valve-operating member away from the second piston with the first piston.

In another construction the first and second valves comprise first and second valve members for engagement with seatings in the second piston and at the end of the bore in the first piston in which the valve-operating member is located and which is remote from the second piston, and normally the first valve member is held away from its seating by stop means carried by the first piston and constructed and arranged to limit movement of that member towards its seating in response to a force applied to the valve-operating member from fluid pressure acting on the second valve member to urge it into engagement with its seating.

When the first piston is advanced in its bore longitudinally the first valve member is carried with it until it engages with its seating in the second piston to isolate the pressure space from the port for connection to the reservoir. Thereafter, further movement of the first piston in the same direction moves the seating in the first piston away from the second valve member, which is held against axial movement by the valve-operating member. Fluid under pressure is admitted to a pressure space between the pistons through a passage defined between the valve-operating member and a bore in the first piston through which the valve-operating member works, and the fluid pressure in the pressure space acts on the second piston to advance it in the bore.

In yet another construction the valves comprise opposed heads carried by opposite ends of the valve-operating member which extends through a longitudinal bore in the second piston and are adapted to engage with seatings at the inner end of the first piston and at the end of the bore in the second piston which is remote from the first piston, the first valve comprising the head for engagement with the seating on the first piston, and the second valve comprising the other head for engagement with the other seating.

Normally the second valve is closed by means of a compression spring acting between the second piston and the head for engagement with the seating in the first piston.

Three embodiments of our invention are illustrated in the accompanying drawings in which.

Figure 1:
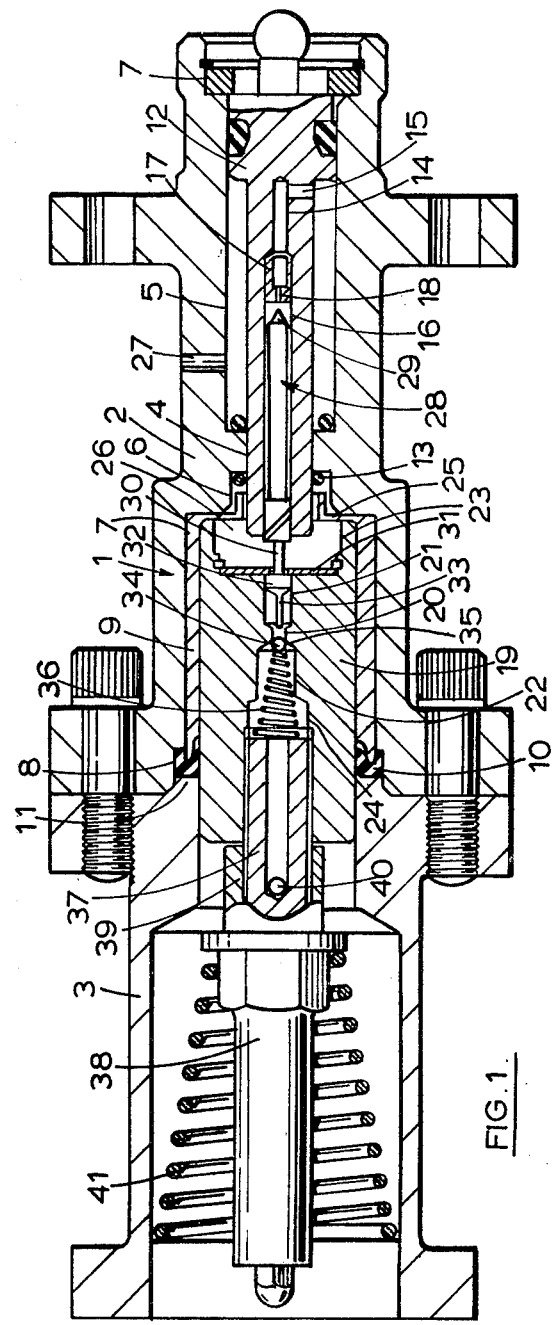
FIG. 1 is a longitudinal section through a control valve assembly, or an hydraulic booster.

In the control valve assembly or hydraulic booster illustrated in FIG. 1 of the drawings a housing 1 comprises two main housing parts 2 and 3 which are clamped together in end-to-end axial relationship with their mating faces in contact.

The housing part 2 is provided with a longitudinally extending bore 4. Opposite ends of the bore 4 are counterbored at 5,6 and the counterbore 6 is counterbored again at 7 with the counterbore 7 itself being counterbored at 8.

The counterbore 7 receives a sleeve 9 which projects into the counterbore 8 and an annular seal 10 is clamped between the wall of the counterbore 8, the free end of the sleeve 9, and an end wall 11 of the housing part 3 which projects into the counterbore 8.

A positively actuated main piston 12 of substantial length works in the bore 5 and its inner end of reduced diameter works through the bore 4 and projects into the sleeve 8 through a seal 13. The piston 12 is provided with a bore 14 which extends inwardly from its inner end for a substantial distance and which leads into a radial passage 15. The inner end of the bore 14 is counterbored at 16 to house a valve seating member 17 which is clamped against the shoulder at the step in diameter and which is provided with a restricted passage 18.

A second floating piston 19 works in the sleeve 9 and projects at its outer end into the bore of the housing part 3. The piston 19 is provided with a longitudinal bore 20 which is counterbored at opposite ends at 21 and 22. Each counterbore 21, 22 is also counterbored again at 23 and 24 respectively. The counterbore 23 defines a recess into which extends the inner end of the main piston 12 and which is of a diameter greater than that of the main piston 12. The second piston 19 also works through the seal 10. The end of the sleeve 8 remote from the seal 10 has an inwardly directed radial flange 25 which forms a stop for the inner end of the second piston 19.

A chamber 26 between the pistons 12 and 19 and extending substantially between the seals 10 and 13 defines a pressure space. Normally the pressure space 26 is in open communication with a reservoir for hydraulic fluid through a radial passage 27 communicating with the passage 18 in the valve seating member 17 through the bore 5. A valve-operating member 28 working in the counterbore 16 is formed at its innermost end of reduced diameter with a valve head 29 defining the first valve. A stem 30 of reduced diameter at the opposite end of the member 28 projects through an opening in an annular stop member 31 which is secured by a circlip within, and at the inner end of, the counterbore 23. The valve head 29 is normally spaced from the passage 18 by an engagement between the stop member 31, and a head 32 working in the counterbore 21. The head 32 has a forward extension 33 of reduced diameter defining a probe or push-rod which is normally spaced from the valve member in the form of a ball 34 and comprising the second valve. The ball 34 is located within the counterbore 22 and is urged into engagement with seating 35 at a shoulder in the step in the change in diameter between the bore 20 and the counterbore 22 by means of a compression spring 36.

The counterbore 24 is screw-threaded internally to receive one end of a hollow union 37 having an imperforate axial extension 38. The union 37 is combined with a radial coupling 39 in the form of a banjo connection including a radial pipe or tube 40 which projects outwardly through an axially extending slot (not shown) in the wall of the housing part 3.

The pipe or tube 40 is connected to a source of hydraulic fluid under pressure conveniently an hydraulic accumulator charged by a high pressure pump, or a high pressure pump supplied with fluid from the reservoir.

In the inoperative position shown in the drawing the pressure space is in free communication with the reservoir since the valve head 29 is spaced from the passage 18, and communication between the source and the pressure space 26 is cut-off by the engagement of the ball 34 with the seating 35.

When the piston 12 is advanced in its bore, initial movement in that direction causes a seating at the end of the valve seating member 17 surrounding the bore 18 to engage with the valve head 29. This cuts-off communication between the reservoir and the pressure space 26. Due to the engagement of the member 17 with the head 29, further movement of the first piston 12 in the same direction advances the valve seating member 17 with it and the extension 33 engages with the ball 34 to move it away from its seating 35 against the force in the spring 36. Hydraulic fluid under pressure is then admitted to the pressure space 26 from the source and this pressure acts on the second piston 19 to advance it in the bore 10. This movement of the second piston 19 may be transmitted to a third piston through the axial extension 38, or the axial extension 38 may act directly or indirectly on another member or part.

The high pressure in the pressure space 26 also acts over the area of the inner end of the first piston 12, which is smaller than that of the second piston 19, to apply a reaction force or feel to the foot of the operator applying the brake through the pedal.

When the pressure within the pressure space 26 equals that of the source, the ball 34 engages with its seating 35 under the influence of the spring 36 and a balanced condition is reached. When the force applied to the pedal is relieved, for example at the end of a braking cycle, the second piston 19 is retracted by compression return spring 41 and the high pressure fluid in the pressure space 26 acts on the inner end of the first piston 12 to move it into its retracted position. Initial movement of the piston 12 in that direction takes with it the valve-operating member 28 until the head 32 engages with the stop member 31. Thereafter, further movement of the piston 12 in the same direction is relative to the valve-operating member 28 thereby moving the head 29 away from the seating surrounding the passage 18 to place the pressure space 26 in communication with the reservoir through the radial passage 27.

In a modification, the pressure space 26 may also be connected to an hydraulic actuator of the wheel brake through a suitable outlet port.

Figure 2:
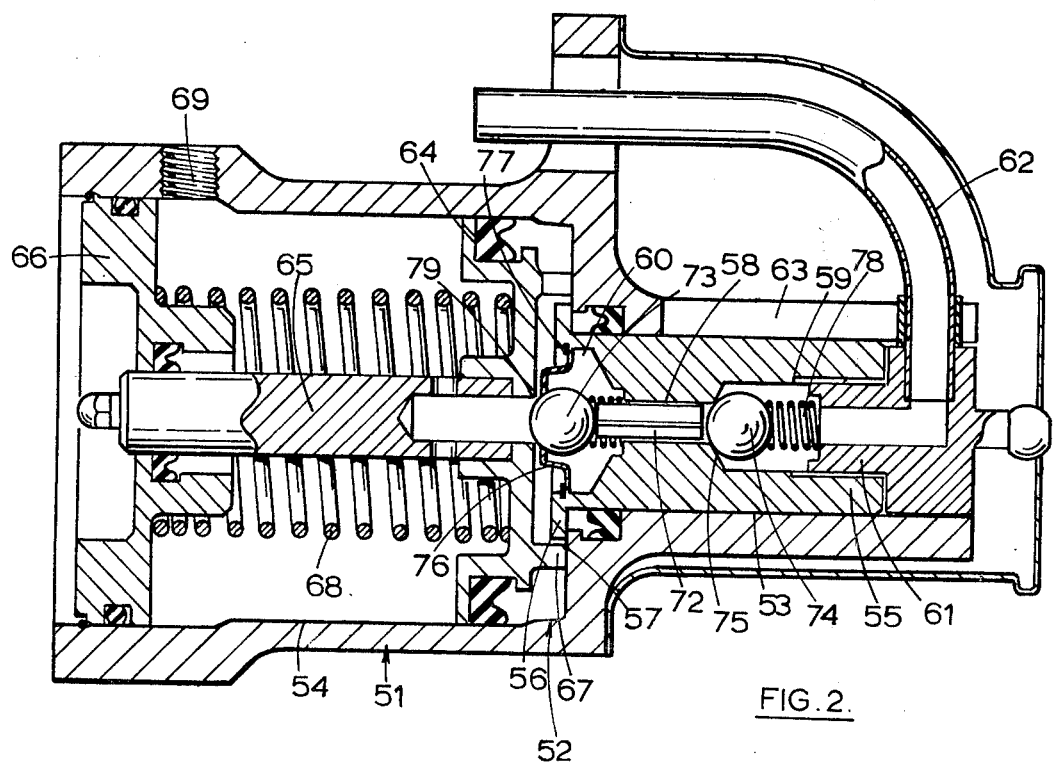
FIG. 2 is a longitudinal section through another control valve assembly or hydraulic booster.

In the control valve assembly or hydraulic booster illustrated in FIG. 2 of the drawings a housing 51 is provided with an open ended longitudinally extending stepped bore 52 comprising portions 53 and 54 of smaller and greater diameters. A positively actuated first piston 55 of substantial length works in the bore portion 53 and includes at its inner end an outwardly directed radial flange 56 which normally engages with a shoulder 57 at a step in the change in diameter between the bore portions 53 and 54. The piston 55 is provided with a longitudinally extending bore 58 which is counterbored at opposite ends at 59 and 60 respectively. The counterbore 59 at the outer end of the piston 55 receives the inner end of a plug 61 defining a union for connection to a hose 62 for high pressure fluid, the hose 62 working in an axially extending slot 63 in the wall of the housing 51.

A second piston 64 working in the bore portion 54 of greater diameter carries an axially extending rod 65 which works through a closure 66 for the end of the bore portion 54 remote from the plug 61. The piston 64 is provided with a rearwardly directed annular abutment 67 which is urged into engagement with the shoulder 57 by means of a compression return spring 68. The abutment 67 is apertured to provide communication between the bore portion 65 of greater diameter and a radial port 69 in the housing 51 for connection to a reservoir for fluid through communicating radial and axial passages in the rod 65 and the piston 64.

A valve-operating member in the form of a rod 72 works in the bore 58 and is engageable at opposite ends with first and second valve members comprising balls 73 and 74 respectively. The ball 74 is housed within a chamber defined by the counterbore 59 and is adapted to engage a seating 75 defined by a shoulder at the step in diameter between the bore 58 and the counterbore 59. The ball 73 is retained within the counterbore 60 by means of an apertured retaining ring 76 which is held in position by means of a circlip 77.

In the inoperative position illustrated in the drawings, the pistons 55 and 64 are fully retracted with the flange 56 and the abutment 67 both engaging with the shoulder 57. In this position the ball 74 is urged into engagement with the seating 75 under the influence of a locating spring 78 and the high pressure fluid acting on the ball. The ball 74 acts on the ball 73 through the valve operating member 72 to urge the ball 73 into engagement with the retaining ring 76. In this position the ball 73 is spaced from a seating 79 at the inner end of the axial passage in the piston 64 so that the bore portion 54 behind the piston 64 and the counterbore 60 are in communication with the radial port 69.

When the first piston 65 is advanced in the bore 53 initial movement urges the ball 73 into engagement with the seating 79 to cut-off communication with the reservoir for fluid through the port 69. Further movement of the piston 55 in the same direction moves the seating 75 away from the valve member 74 so that high pressure fluid can enter the counterbore 60 through a clearance between the bore 58 and the valve-operating member 72. Conveniently the clearance may comprise at least one axial slot or other passage in the valve operating member. The high pressure fluid in the counterbore 60 acts over the full area of the piston 64 to advance it in the bore and apply a force to a member or other device to be operated either directly or indirectly by the rod 65.

The high pressure fluid also acts over the area of the inner end of the piston 55 to apply a reaction force or feel to the foot of the operator applying a brake through a pedal.

When the pressure acting on the second piston 64 equals that of the pressure at the source, the ball 74 engages with its seating 75 under the influence of the spring 78 and a balanced condition is reached.

When the force applied to the pedal is relieved, for example at the end of a braking cycle, the second piston 64 is retracted by the compression return spring 68 and the high pressure fluid acting on the inner end of the piston 64 acts on the inner end of the first piston 55 to move it into its retracted position. Initial movement of the piston 55 in that direction takes with it the ball 73 due to the engagement therewith of the retaining ring 76. This ensures that the ball 73 is moved away from its seating 79 to connect the chamber at the rear of the piston 64 to reservoir.

In a modification, the pressure space defined by the chamber behind the second piston 64 may also be connected to an hydraulic actuator of the wheel brake through a suitable outlet port.

Figure 3:
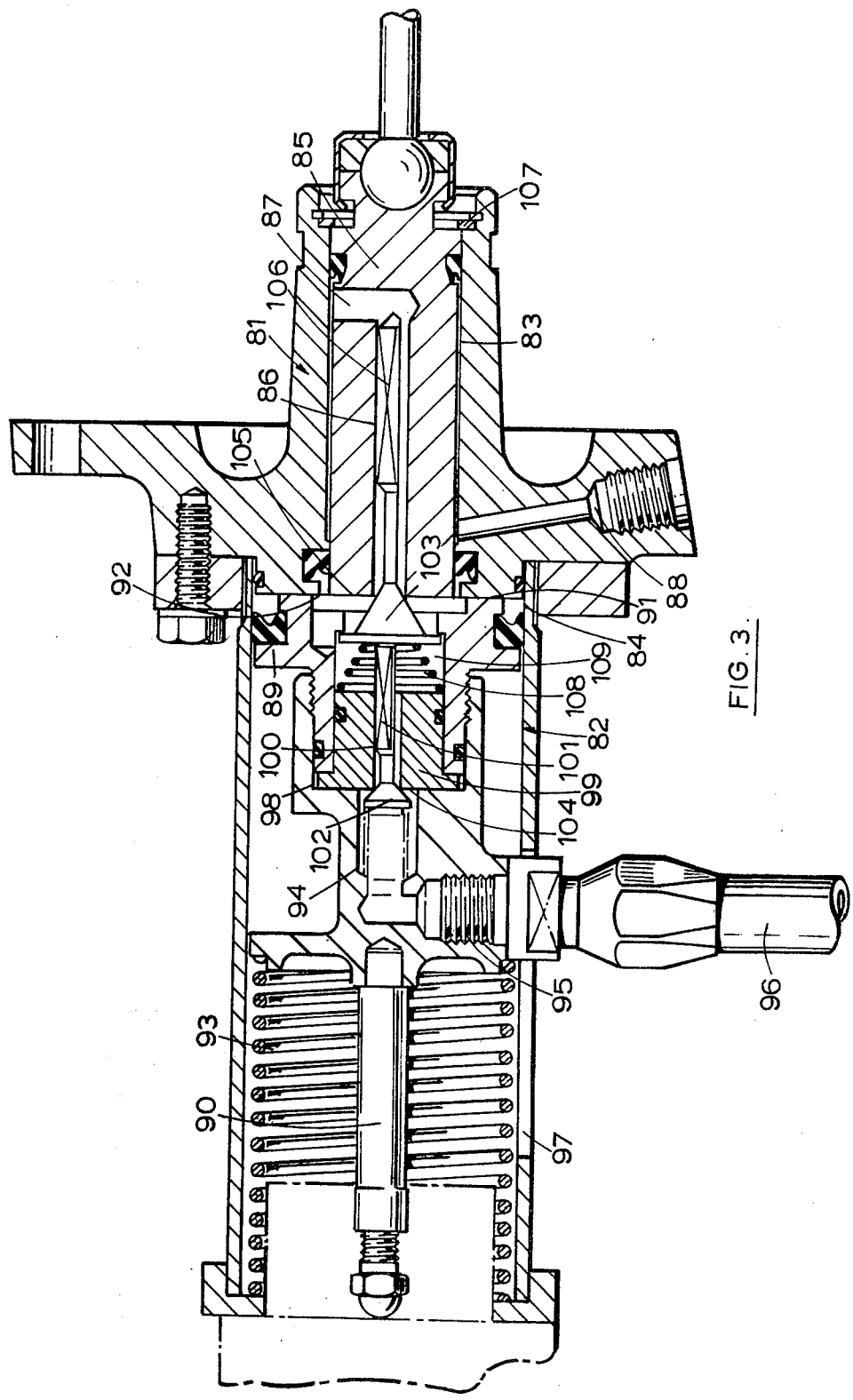
FIG. 3 is a longitudinal section through yet another control valve assembly or hydraulic booster.

In the control valve assembly or hydraulic booster illustrated in FIG. 3 of the drawings a two-part housing 81 is provided with an open ended longitudinally extending stepped bore 82 comprising portions 83 and 84 of smaller and greater diameters. A positively actuated first piston 85 of substantial length works in the bore portion 83 and is provided with a longitudinally extending blind bore 86 leading into a radial passage 87 for communication through the bore portion 83 with a port 88 for connection to a reservoir for fluid.

A second piston 89 working in the bore portion 84 of greater diameter carries an axially extending rod 90. The piston 89 is provided with a rearwardly directed annular abutment 91 which is urged into engagement with a shoulder 92 at the step in diameter by means of a compression return spring 93.

The piston 89 is provided in its end adjacent to the piston 85 with a blind bore 94 which leads into radial passage 95 for connection to a source of high pressure fluid through a hose 96 working in an axially extending slot 97 in the wall of the housing 81. The bore 94 is counterbored at 98 to receive a valve seating member 99 which is provided with an open-ended bore 100.

A valve-operating member in the form of a rod 101 works through the bore 100 and carries at opposite ends first and second valve members comprising integral heads 102 and 103 of smaller and greater diameters respectively. The head 102 is housed within a chamber defined by the counterbore 94 and is adapted to engage a seating 104 at the inner end of the seating member 99. The other head 103 is normally spaced from a seating 105 at the inner end of the piston 85, the head 103 being provided with a stem 106 guided to slide in the bore 86.

In the inoperative position illustrated in the drawings, the pistons 85 and 89 are fully retracted with the piston 85 engaging with a backstop 107 and the piston 89 engaging with the shoulder 91. In this position the head 102 is urged into engagement with the seating 104 by means of a compression spring 108 acting between the seating member 99 and the head 103 and high pressure fluid acting on the head 102. The seating 105 at the inner end of the piston 85 is spaced from the head 103 so that a chamber 109 is in communication with the reservoir.

When the first piston 85 is advanced initial movement urges the seating 105 into engagement with the head 103 to cut-off communication with the reservoir for fluid. Further movement of the piston 85 in the same direction moves the head 102 away from the seating 104 so that high pressure fluid can enter the counterbore 100 and the chamber 109 through a clearance between the bore 100 and the valve-operating member 101. Conveniently the clearance may comprise at least one axial slot or other passage in the valve operating member 101. The high pressure fluid in the chamber 109 acts over the full area of the piston 89 to advance it in the bore 84 and apply a force to a member or other device to be operated either directly or indirectly by the rod 90.

The high pressure fluid also acts over the area of the inner end of the piston 85 to apply a reaction force or feel to the foot or the operator applying a brake through a pedal.

When the pressure acting on the second piston 89 equals that of the pressure at the source, the head 102 engages with its seating 104 under the influence of the spring 108 and a balanced condition is reached.

When the force applied to the pedal is relieved, for example at the end of a braking cycle, the second piston 89 is retracted by the compression return spring 93 and the high pressure fluid acting on the inner end of the piston 89 acts on the inner end of the first piston 85 to move it into its retracted position.

In a modification, the pressure space defined by the chamber 109 behind the second piston 89 may also be connected to an hydraulic actuator of a wheel brake through a suitable outlet port.

I claim:

1. A control valve assembly for a vehicle braking system comprising a cylinder body having a longitudinally extending bore, a first positively actuated piston responsive to an applying force and working in said piston bore, said first piston being movable between a retracted position and an operative advanced position, a second floating piston working in said piston bore in a position in advance of said first piston, a pressure space defined in said piston bore between said pistons, a first valve controlling communication between a port for connection to a reservoir for fluid and said pressure space, said first valve being movable between a normally open position and a closed position in response to movement of said first piston away from said retracted position, a second valve controlling communication between said pressure space and a passage for connection to a source of fluid under pressure, said second valve being movable between a normally closed position and an open position in response to movement of said first piston away from said retracted position but subsequent to movement of said first valve into said closed position, said first piston being provided with a longitudinal valve bore interconnecting said first and second valves, said first valve comprising a first seating in said second piston, a first ball for engagement with said first seating, and a stop member carried by said first piston for holding said first ball away from said first seating when said first piston is in said retracted position, said stop member comprising a retaining ring provided with an aperture through which said first ball engages said first seating, said second valve comprising a second seating in said first piston at the end of said valve bore remote from said first valve, and a second ball for engagement with said second seating and normally engaged therewith by fluid under pressure from said source when said first piston is in said retracted position, and an unbiassed valve-operating member common to and separate from both said balls guided to slide in said valve bore, said valve-operating member being so constructed and arranged that said second ball re-engages with said second seating and said first ball is subsequently moved away from said first seating when said first piston is returned to said inoperative position in response to pressure remaining in said pressure space.

* * * * *